(12) United States Patent
Sugawara et al.

(10) Patent No.: US 9,356,864 B2
(45) Date of Patent: May 31, 2016

(54) PACKET TRANSFER APPARATUS AND PACKET RELAY METHOD

(71) Applicant: ALAXALA Networks Corporation, Kanagawa (JP)

(72) Inventors: Kentaro Sugawara, Kawasaki (JP); Yuichi Ishikawa, Tokyo (JP); Yutaka Takagi, Yokohama (JP); Takao Nara, Yokohama (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 33 days.

(21) Appl. No.: 14/262,831

(22) Filed: Apr. 28, 2014

(65) Prior Publication Data

US 2015/0043582 A1 Feb. 12, 2015

(30) Foreign Application Priority Data

Aug. 8, 2013 (JP) .................................. 2013-164795

(51) Int. Cl.
*H04L 12/54* (2013.01)
*H04L 12/741* (2013.01)
*H04L 12/743* (2013.01)

(52) U.S. Cl.
CPC .......... *H04L 45/745* (2013.01); *H04L 45/7457* (2013.01)

(58) Field of Classification Search
CPC ... H04L 45/745; H04L 45/7457; H04L 47/10; H04L 47/11; H04L 47/115; H04L 47/12; H04L 47/122; H04L 47/125; H04L 47/24; H04L 47/2409; H04L 47/2416; H04L 47/2441
See application file for complete search history.

(56) References Cited

U.S. PATENT DOCUMENTS

| | | | | |
|---|---|---|---|---|
| 6,944,169 | B1* | 9/2005 | Yoshizawa | H04L 41/082 370/410 |
| 7,286,535 | B2* | 10/2007 | Ishikawa | H04L 47/10 370/351 |
| 7,453,892 | B2* | 11/2008 | Buskirk | H04L 47/10 370/229 |
| 9,088,495 | B2* | 7/2015 | Ajanovic | G06F 13/124 |
| 2003/0126233 | A1* | 7/2003 | Bryers et al. | 709/219 |
| 2003/0133443 | A1* | 7/2003 | Klinker | H04L 12/2602 370/353 |
| 2003/0189932 | A1* | 10/2003 | Ishikawa et al. | 370/392 |
| 2005/0083837 | A1* | 4/2005 | Maehara | H04L 1/0061 370/229 |
| 2009/0177788 | A1* | 7/2009 | Ishikawa et al. | 709/228 |
| 2009/0232000 | A1* | 9/2009 | Watanabe et al. | 370/235 |

FOREIGN PATENT DOCUMENTS

JP 2009-231890 A 8/2009

* cited by examiner

*Primary Examiner* — Kevin Mew
(74) *Attorney, Agent, or Firm* — Mattingly & Malur, PC (57) ABSTRACT

It is provided a packet transfer apparatus comprising: a packet reception part; a packet transmission part; a packet generation part for generating an own-apparatus-originated packet serving as a packet for instructing a predetermined operation and outputting the own-apparatus-originated packet; a packet search part for determining a content of flow control and searching for an output circuit; a search memory for storing the content of the flow control and information for identifying the output circuit outputting the packet; and a packet transfer processing part. The packet reception part determines whether the received packet is the own-apparatus-originated packet; and outputs a self-origination flag indicating a result of the determining and header information of the received packet to the packet search part. The packet search part determines the content of the flow control for the received packet by referring to the search memory based on the self-origination flag and the header information.

10 Claims, 8 Drawing Sheets

PACKET TRANSFER APPARATUS AND PACKET RELAY METHOD

CLAIM OF PRIORITY

The present application claims priority from Japanese patent application JP 2013-164795 filed on Aug. 8, 2013, the content of which is hereby incorporated by reference into this application.

BACKGROUND OF THE INVENTION

This invention relates to a packet transfer apparatus for receiving a packet and transferring the received packet to another apparatus.

A related-art packet transfer apparatus performs flow control to which an access control list (ACL) is applied. As a related art therefor, there is known a method of realizing the flow control to which an ACL using a content addressable memory (CAM) is applied. An example thereof is disclosed in, for example, Japanese Patent Application Laid-open No. 2009-231890.

In Japanese Patent Application Laid-open No. 2009-231890, it is disclosed that the CAM identifies a flow entry based on information on an IP packet header such as a source IP address.

In general, the packet output from the packet transfer apparatus itself often includes information relating to network control, and therefore needs to be handled separately from the other packets. In the following description, the packet output from the packet transfer apparatus itself is referred to also as "own-apparatus-originated packet".

However, in an architecture in which the same path as an HW transfer path is allocated as a path for transferring the own-apparatus-originated packet, when a source IP address (SIP) of the ACL is set to "d.c.", it is not possible to distinguish the own-apparatus-originated packet from the other packets. Here, "d.c." represents "don't care" indicating that no concern is given to a particular piece of information (bit).

In order to solve the above-mentioned problem, the IP address of the packet transfer apparatus is set in the ACL as the SIP, to thereby be able to identify the own-apparatus-originated packet. However, there is a problem in that, when a packet whose SIP is spoofed is transmitted from a malicious attacker, the packet transfer apparatus cannot identify the spoofed packet.

Further, there is a problem in that, with regard to entries of the CAM for which filter control for the ACL is set, when only the own-apparatus-originated packet is caused to pass, a large number of entries needs to be set in order to exclude the own-apparatus-originated packet. For example, in order to exclude the IP address "5" of the packet transfer apparatus from among IP addresses "0" to "7", three entries of "0xx", "100", and "11x" are necessary. It should be noted that "x" represents "don't care".

SUMMARY OF THE INVENTION

This invention has been made in order to solve the above-mentioned problems.

The representative one of inventions disclosed in this application is outlined as follows. There is provided a packet transfer apparatus to be coupled to at least one input line and at least one output line to receive a packet and transfer the packet to another apparatus, the packet transfer apparatus comprising: a packet reception part for receiving the packet; a packet transmission part for transmitting the packet from the at least one output line; a packet generation part for generating an own-apparatus-originated packet serving as a packet for instructing a predetermined operation and outputting the own-apparatus-originated packet to the packet reception part; a packet search part for determining a content of flow control for the received packet and searching for an output circuit through which the received packet is to be output; a search memory for storing the content of the flow control and information for identifying the output circuit through which the packet is to be output; and a packet transfer processing part for executing switching processing for the received packet. The packet reception part determines whether the received packet is the own-apparatus-originated packet, and outputs a self-origination flag indicating a result of the determining and header information of the received packet to the packet search part. The packet search part determines the content of the flow control for the received packet by referring to the search memory based on the self-origination flag and the header information.

According to one embodiment of this invention, it is possible to distinguish the own-apparatus-originated packet from the other packets based on the self-origination flag and to apply the flow control to each of the packets.

Objects, components, and effects other than those described above become more apparent from the following description of an embodiment.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Now, an embodiment of this invention is described with reference to the accompanying drawings.

First Embodiment

Figure 1:
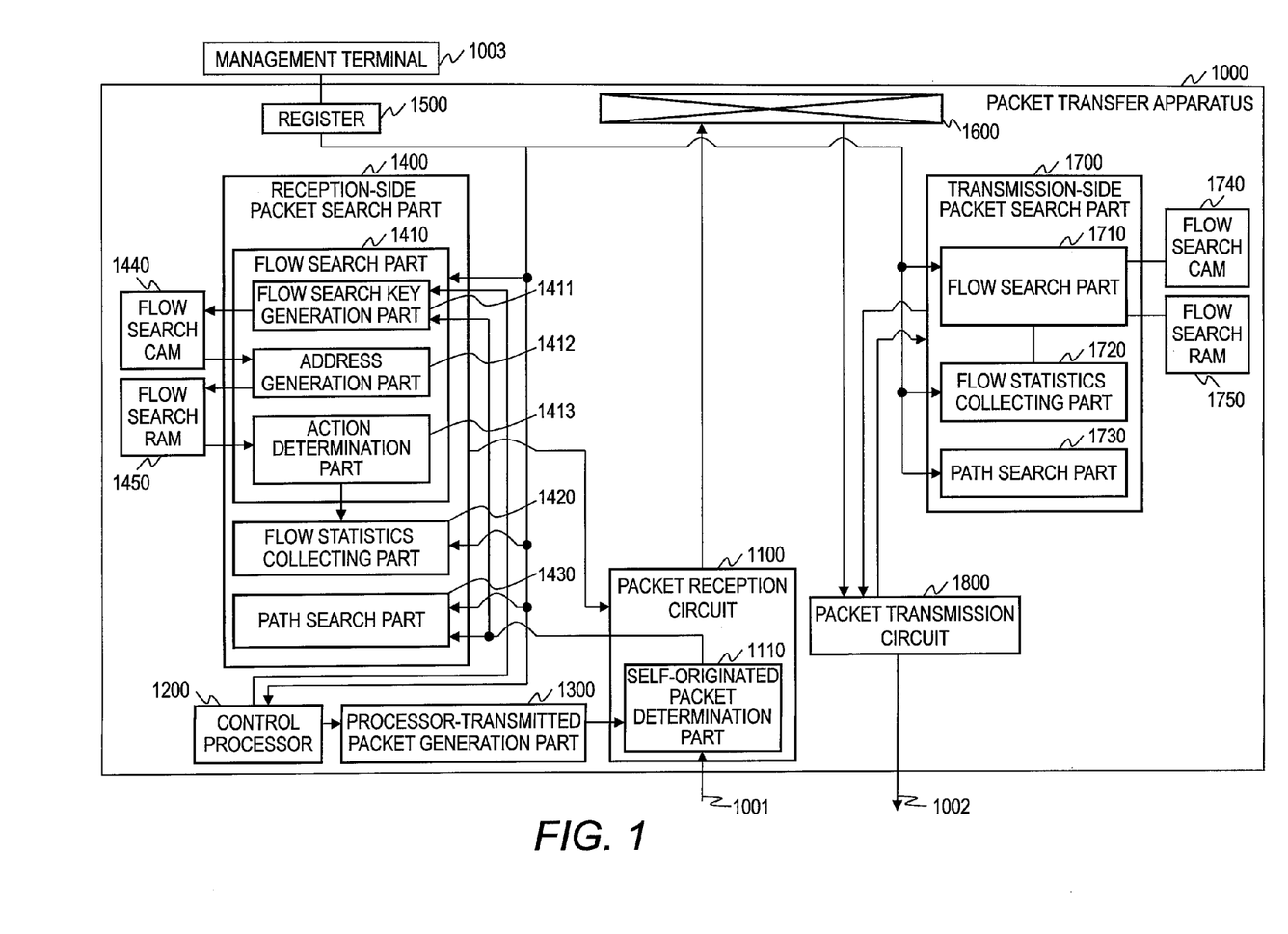
FIG. 1 is a block diagram illustrating a configuration of a packet relay transfer apparatus according to an embodiment of this invention.

FIG. 1 is a block diagram illustrating a configuration of a packet transfer apparatus 1000 according to an embodiment of this invention.

The packet transfer apparatus 1000 transfers an input packet to another apparatus based on header information of the packet. The packet transfer apparatus 1000 according to this embodiment is coupled to at least one input line 1001, at least one output line 1002, and a management terminal 1003.

The input line 1001 is a communication line through which the packet is input from another apparatus, and the output line 1002 is a communication line through which the packet is output to another apparatus. The management terminal 1003 is a computer for performing various settings for the packet transfer apparatus 1000.

The packet transfer apparatus 1000 includes a packet reception circuit 1100, a control processor 1200, a processor-transmitted packet generation part 1300, a reception-side packet search part 1400, a register 1500, a packet transfer processing part 1600, a transmission-side packet search part 1700, and a packet transmission circuit 1800.

The control processor 1200 is an arithmetic unit for controlling the overall packet transfer apparatus 1000. Specifically, the control processor 1200 instructs to generate the packet, and instructs to perform settings for a flow search CAM 1440, a flow search RAM 1450, and the like based on setting information stored in the register 1500.

The processor-transmitted packet generation part 1300 generates a packet or the like for controlling the packet transfer apparatus 1000 based on a packet generation instruction received from the control processor 1200.

The packet reception circuit 1100 is a circuit for executing reception processing for a packet. At least one input line 1001 is coupled to the packet reception circuit 1100. Further, the packet reception circuit 1100 according to this embodiment includes a self-originated packet determination part 1110. The self-originated packet determination part 1110 determines whether or not the received packet is an own-apparatus-originated packet.

The packet reception circuit 1100 outputs in-apparatus information, which includes a determination result obtained by the self-originated packet determination part 1110, and the header information of the received packet to a flow search key generation part 1411 and a path search part 1430 of the reception-side packet search part 1400. Further, the packet reception circuit 1100 outputs the received packet to the packet transfer processing part 1600 along with a processing result output from the reception-side packet search part 1400.

The reception-side packet search part 1400 executes reception-side determination processing relating to the packet. For example, the reception-side packet search part 1400 executes flow control of filter processing, QoS processing, or the like for the received packet. The reception-side packet search part 1400 includes a flow search part 1410, a flow statistics collecting part 1420, and the path search part 1430. Further, the flow search CAM 1440 and the flow search RAM 1450 are coupled to the reception-side packet search part 1400.

The flow search part 1410 identifies a flow corresponding to the packet, searches for information necessary for the flow control for the flow, and determines the content of the flow control. The flow search part 1410 includes the flow search key generation part 1411, an address generation part 1412, and an action determination part 1413.

The flow search key generation part 1411 generates a flow search key used for the flow search CAM 1440 to search for a flow entry based on the information input from the packet reception circuit 1100. Further, the flow search key generation part 1411 outputs the generated flow search key to the flow search CAM 1440.

The flow search CAM 1440 searches for the flow entry that matches the flow search key output from the flow search key generation part 1411, and outputs an address of the retrieved flow entry to the address generation part 1412. In this embodiment, it is assumed that the flow search CAM 1440 uses a ternary CAM in which "0", "1", and "d.c." can be set.

The address generation part 1412 generates the address of a RAM entry of the flow search RAM 1450 corresponding to the retrieved flow entry based on the address output from the flow search CAM 1440. Further, the address generation part 1412 outputs the generated address to the flow search RAM 1450.

The flow search RAM 1450 searches, based on the address output from the address generation part 1412, for the RAM entry that matches the address. The flow search RAM 1450 outputs the content of the flow control of the retrieved RAM entry to the action determination part 1413.

The action determination part 1413 outputs the content of the flow control output from the flow search RAM 1450 to the flow statistics collecting part 1420. Further, the action determination part 1413 temporarily retains the content of the flow control.

The flow statistics collecting part 1420 acquires statistical information relating to the flow control for the packet on a reception side. Specifically, the flow statistics collecting part 1420 acquires the statistical information such as the number of packets and the number of bytes for each flow based on the content of the flow control and the packet header information. The flow statistics collecting part 1420 stores the acquired statistical information in a memory (not shown).

The path search part 1430 refers to a memory (not shown) for a path search to identify the output line 1002 for outputting the packet based on the packet header information output from the packet reception circuit 1100.

The reception-side packet search part 1400 outputs the content of the flow control, the information on the output line 1002, and the processing result such as the statistical information on the flow to the packet reception circuit 1100.

The packet transfer processing part 1600 performs predetermined switching based on the information on the output line 1002, and outputs a body of the packet, the packet header information, and the information on the output line 1002 and the like to the packet transmission circuit 1800.

The packet transmission circuit 1800 includes a transmission buffer (not shown) for temporarily accumulating the packet subjected to the switching, and executes transmission processing for the packet. Further, the packet transmission circuit 1800 outputs the packet header information and the like to a flow search part 1710 and a path search part 1730 of the transmission-side packet search part 1700.

The transmission-side packet search part 1700 executes transmission-side determination processing relating to the packet. It should be noted that the transmission-side packet search part 1700 executes the same processing as that of the reception-side packet search part 1400. The transmission-side packet search part 1700 includes the flow search part 1710, a flow statistics collecting part 1720, and the path search part 1730. Further, a flow search CAM 1740 and a flow search RAM 1750 are coupled to the transmission-side packet search part 1700.

It should be noted that the flow search part 1710, the flow statistics collecting part 1720, the path search part 1730, the flow search CAM 1740, and the flow search RAM 1750 are the same as the flow search part 1410, the flow statistics collecting part 1420, the path search part 1430, the flow search CAM 1440, and the flow search RAM 1450, respectively, and hence descriptions thereof are omitted.

The transmission-side packet search part 1700 outputs the processing result to the packet transmission circuit 1800.

The register 1500 stores various kinds of setting information output from the management terminal 1003. The various kinds of setting information stored in the register 1500 are output to the control processor 1200, the flow search part 1410, the flow statistics collecting part 1420, the path search part 1430, the flow search part 1710, the flow statistics collecting part 1720, and the path search part 1730.

The flow search part 1410, the flow statistics collecting part 1420, the path search part 1430, the flow search part 1710, the flow statistics collecting part 1720, and the path search part 1730 each update the information and the like stored in the memory based on the setting information. For example, the flow search part 1410 adds an entry to the flow search CAM 1440 or the flow search RAM 1450, deletes an entry from the flow search CAM 1440 or the flow search RAM 1450, or performs other such operation.

Next, a description is made of information and the like processed by the packet transfer apparatus 1000 and stored therein.

Figure 2:
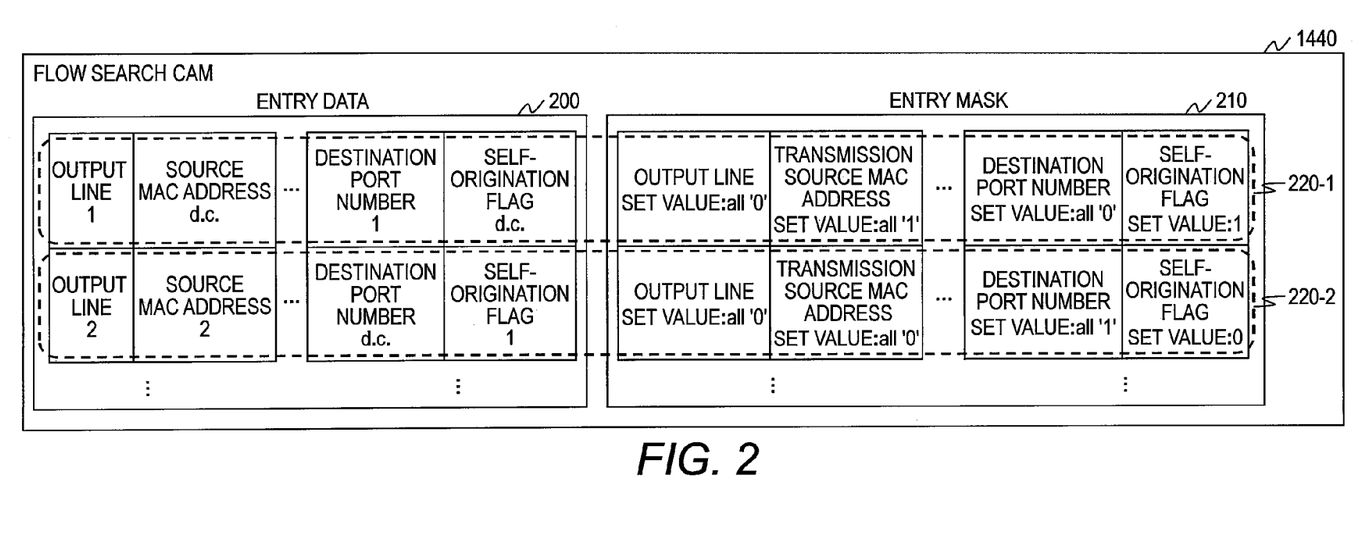
FIG. 2 is an explanatory diagram illustrating an example of the flow entry stored in the flow search CAM according to the embodiment of this invention.

FIG. 2 is an explanatory diagram illustrating an example of the flow entry stored in the flow search CAM 1440 according to the embodiment of this invention.

The flow search CAM 1440 stores at least one flow entry 220 formed of entry data 200 and an entry mask 210. FIG. 2 illustrates an example in which two flow entries 220-1 and 220-2 are stored.

The entry data 200 stores a value of information for identifying the flow corresponding to the packet. Specifically, the entry data 200 includes a plurality of pieces of information each formed of at least one bit.

This embodiment has a feature in that the information within the entry data 200 includes a "self-origination flag". The "self-origination flag" stores a bit for identifying whether or not the packet is the own-apparatus-originated packet. In this embodiment, the bit whose "self-origination flag" is "0" indicates the packet other than the own-apparatus-originated packet, and the bit whose "self-origination flag" is "1" indicates the own-apparatus-originated packet.

It should be noted that the bit that forms each of the pieces of information such as an output line, a source MAC address, a destination port number, and the self-origination flag stores any one of "0", "1", and "d.c.".

The entry mask 210 stores a bit for identifying information to be referred to at a time of a search for the flow entry.

Specifically, the piece of information in which "1" is set among the entry masks 210 indicates that the value of the entry data 200 corresponding to the piece of information is not to be referred to. In other words, the piece of information in which "1" is set is masked at the time of the search for the flow entry. In this case, the value of the piece of information within the entry data 200 is "d.c.". Further, the piece of information in which "0" is set among the entry masks 210 indicates that the value of the entry data 200 corresponding to the piece of information is to be referred to.

Figure 3A:
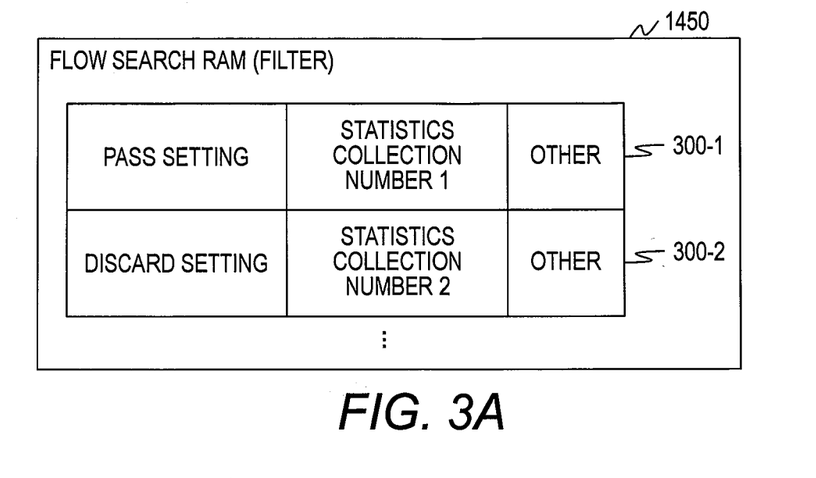
FIGS. 3A and 3B are explanatory diagrams illustrating examples of the flow search RAM according to the embodiment of this invention.
Figure 3B:
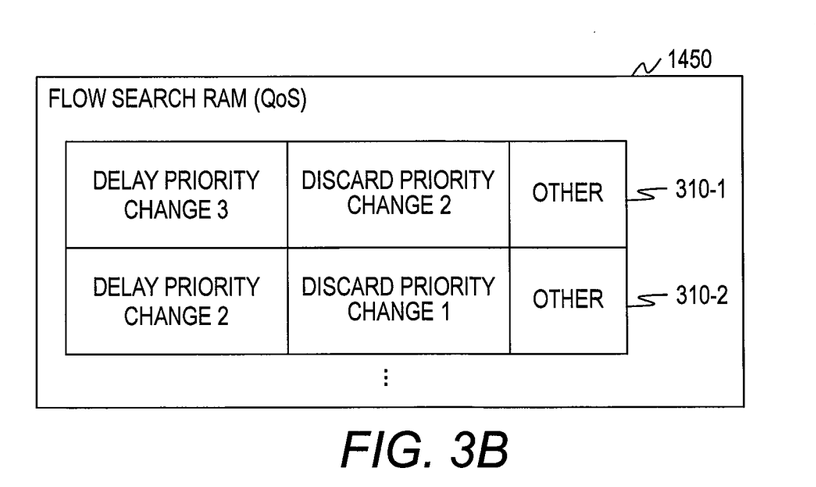

In the following description, masking all the bits that form the information is referred to as "global mask". It should be noted that a local mask for masking each of the individual bits that form the information may be used. For example, "0xx" or "11x" corresponds to the local mask. FIG. 3A and FIG. 3B are explanatory diagrams illustrating examples of the flow search RAM 1450 according to the embodiment of this invention.

FIG. 3A illustrates an example of the flow search RAM 1450 used for the filter processing. FIG. 3B illustrates an example of the flow search RAM 1450 used for the QoS processing.

The flow search RAM 1450 stores at least one RAM entry. The RAM entries correspond to the flow entries 220 on a one-to-one basis, and are each formed of a plurality of pieces of information.

In the case of the flow search RAM 1450 illustrated in FIG. 3A, the flow entry 220-1 is associated with a RAM entry 300-1, and the flow entry 220-2 is associated with a RAM entry 300-2. In the case of the flow search RAM 1450 illustrated in FIG. 3B, the flow entry 220-1 is associated with a RAM entry 310-1, and the flow entry 220-2 is associated with a RAM entry 310-2.

It should be noted that the RAM entry for the filter processing and the RAM entry for the QoS processing may coexist in the flow search RAM 1450.

Figure 4:
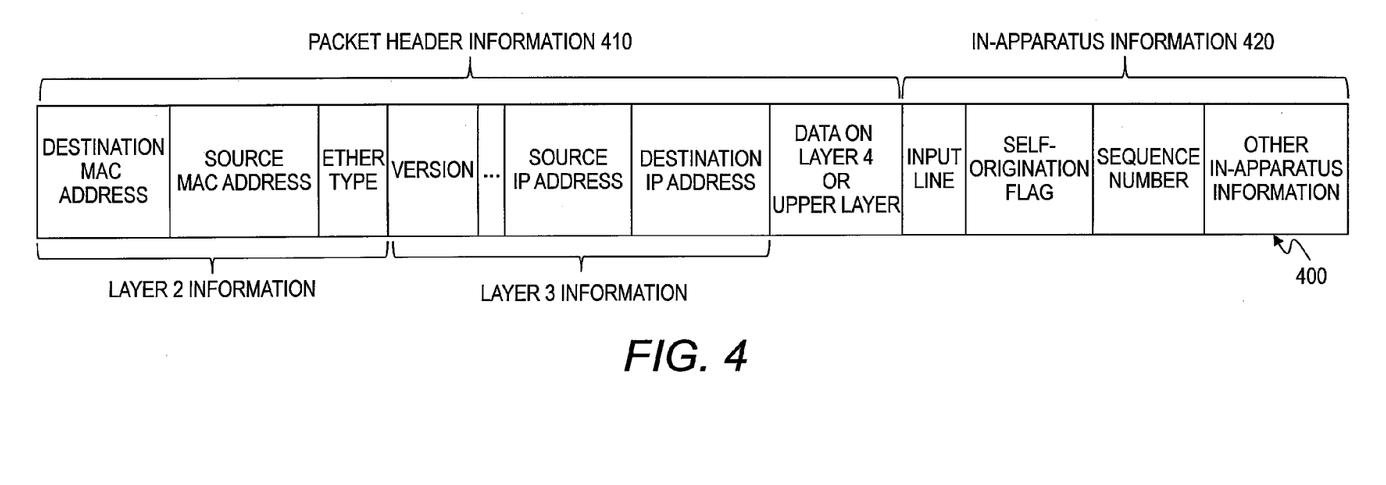
FIG. 4 is an explanatory diagram illustrating an example of data handled by the packet transfer apparatus according to the embodiment of this invention.

FIG. 4 is an explanatory diagram illustrating an example of data 400 handled by the packet transfer apparatus 1000 according to the embodiment of this invention.

The data 400 illustrated in FIG. 4 is formed of packet header information 410 and in-apparatus information 420.

The packet header information 410 stores information on each layer. For example, Layer 2 information includes a destination MAC address, the source MAC address, and an Ether type, and Layer 3 information includes a version, a source IP address, a destination IP address, and the like.

It should be noted that the Ether type indicates a kind of communication protocol used to transfer the packet. Further, Link Aggregation Control Protocol (LACP), Address Resolution Protocol (ARP), Open Shortest Path First (OSPF), Routing Information Protocol (RIP), or the like is conceivable as the communication protocol used for the own-apparatus-originated packet. By combining the self-origination flag with the Ether type, it is possible to control the own-apparatus-originated packet in more detail.

It should be noted that the information included in each layer is known, and hence a detailed description thereof is omitted.

The in-apparatus information 420 is information given within the packet transfer apparatus 1000. The in-apparatus information 420 includes an input line, the self-origination flag, a sequence number, and other in-apparatus information. This invention has a feature in that the in-apparatus information 420 includes the self-origination flag.

It should be noted that the packet header information 410 and the in-apparatus information 420 may be handled as separate pieces of information.

Figure 5:
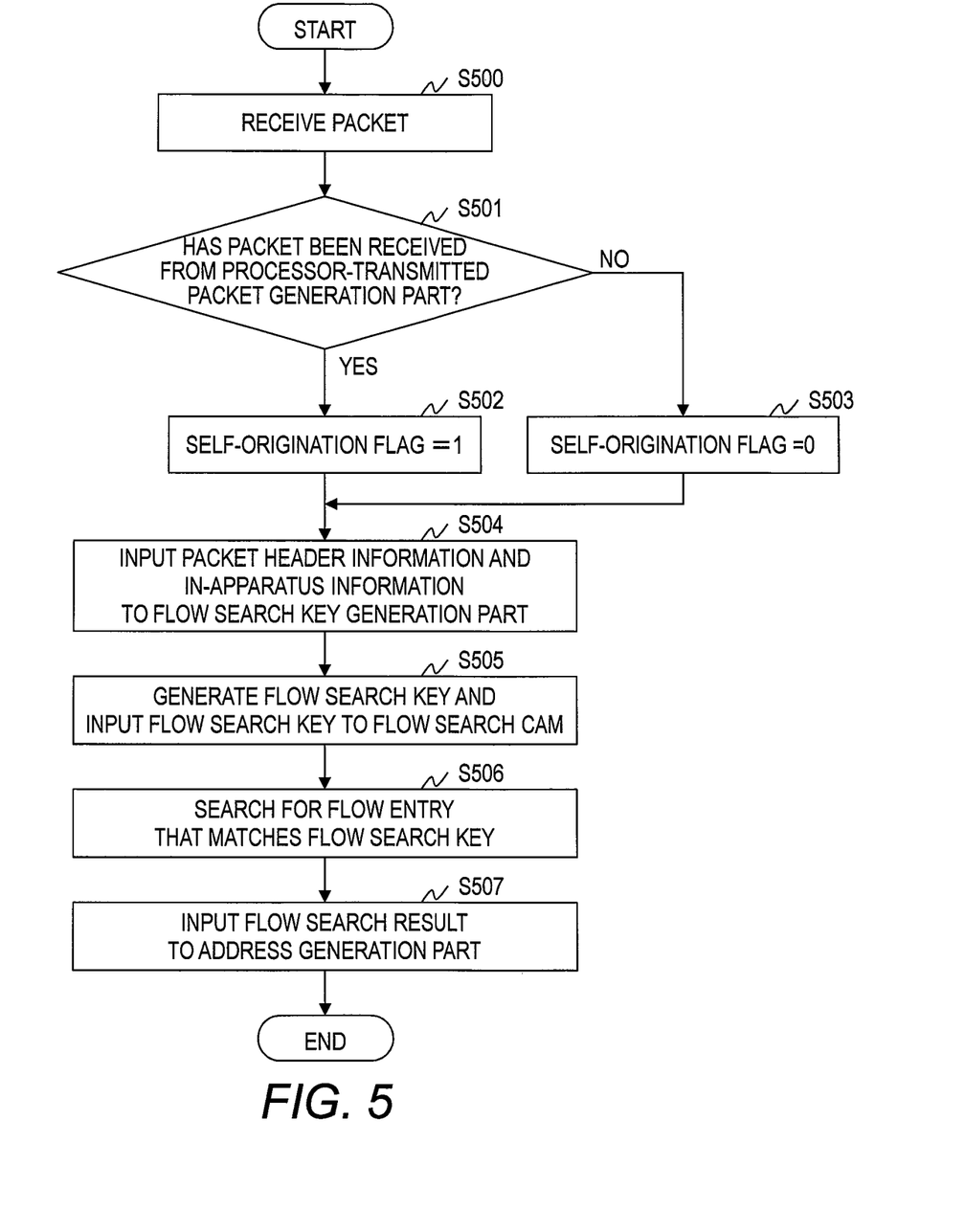
FIG. 5 is a flowchart illustrating a part of the reception processing for the packet according to the embodiment of this invention.

FIG. 5 is a flowchart illustrating a part of the reception processing for the packet according to the embodiment of this invention.

When receiving the packet (Step S500), the packet reception circuit 1100 of the packet transfer apparatus 1000 starts the reception processing for the packet. It should be noted that the packet reception circuit 1100 receives the packet from the input line 1001 or the processor-transmitted packet generation part 1300.

The self-originated packet determination part 1110 of the packet reception circuit 1100 determines whether or not the received packet is a packet received from the processor-transmitted packet generation part 1300 (Step S501). In other words, it is determined whether or not the received packet is the own-apparatus-originated packet.

The self-originated packet determination part 1110 determines whether or not the received packet is the own-apparatus-originated packet based on, for example, an identification number or the like of the port through which the packet has been received. It should be noted that this invention is not limited to a determination method involving the own-apparatus-originated packet, and may use another determination method.

When it is determined that the received packet is the packet received from the processor-transmitted packet generation part 1300, the self-originated packet determination part 1110 sets the self-origination flag to "1" (Step S502), and then the procedure advances to Step S504.

When it is determined that the received packet is not the packet received from the processor-transmitted packet generation part 1300, the self-originated packet determination part 1110 sets the self-origination flag to "0" (Step S503), and then the procedure advances to Step S504.

After the self-origination flag is set, the packet reception circuit 1100 acquires the packet header information 410 from the received packet, further acquires the in-apparatus information 420 such as the set self-origination flag, and inputs the acquired packet header information 410 and in-apparatus information 420 to the flow search key generation part 1411 (Step S504). At this time, the packet reception circuit 1100 inputs the acquired packet header information 410 to the path search part 1430 as well.

The flow search key generation part 1411 uses the packet header information 410 and the in-apparatus information 420 to generate the flow search key, and inputs the generated flow search key to the flow search CAM 1440 (Step S505).

A known technology may be used for a generation method for the flow search key, and hence a detailed description thereof is omitted, but, for example, the flow search key including a plurality of pieces of information formed of at least one bit is generated. It should be noted that this embodiment has a feature in that the flow search key includes the bit of the self-origination flag.

The flow search CAM 1440 searches for the flow entry 220 that matches the input flow search key (Step S506). In other words, the flow corresponding to the received packet is identified.

Specifically, the flow search CAM 1440 does not refer to the piece of information whose entry data 200 has the value of "d.c.", and compares the values of the other pieces of information, to thereby search for the flow entry 220 that matches the flow search key. It should be noted that a known technology may be used for a search method for the flow entry 220 based on the flow search key, and hence a detailed description thereof is omitted.

The flow search CAM 1440 inputs the address of the retrieved flow entry 220 to the address generation part 1412 as a flow search result (Step S507), and brings the processing to an end.

After executing the processing of Step S507, the packet transfer apparatus 1000 executes the following processing.

The address generation part 1412 generates the address for referring to the flow search RAM 1450 based on the address of the retrieved flow entry 220, and inputs the generated address to the flow search RAM 1450.

The flow search RAM 1450 searches for the RAM entry based on the input address, and outputs the content of the flow control stored in the retrieved RAM entry to the packet reception circuit 1100 and the flow statistics collecting part 1420.

By the above-mentioned processing, the content of the flow control for the received packet is determined.

It should be noted that the processings executed by the flow statistics collecting part 1420, the path search part 1430, the packet transfer processing part 1600, and the transmission-side packet search part 1700 are the same as known processings, and hence descriptions thereof are omitted.

Figure 6:
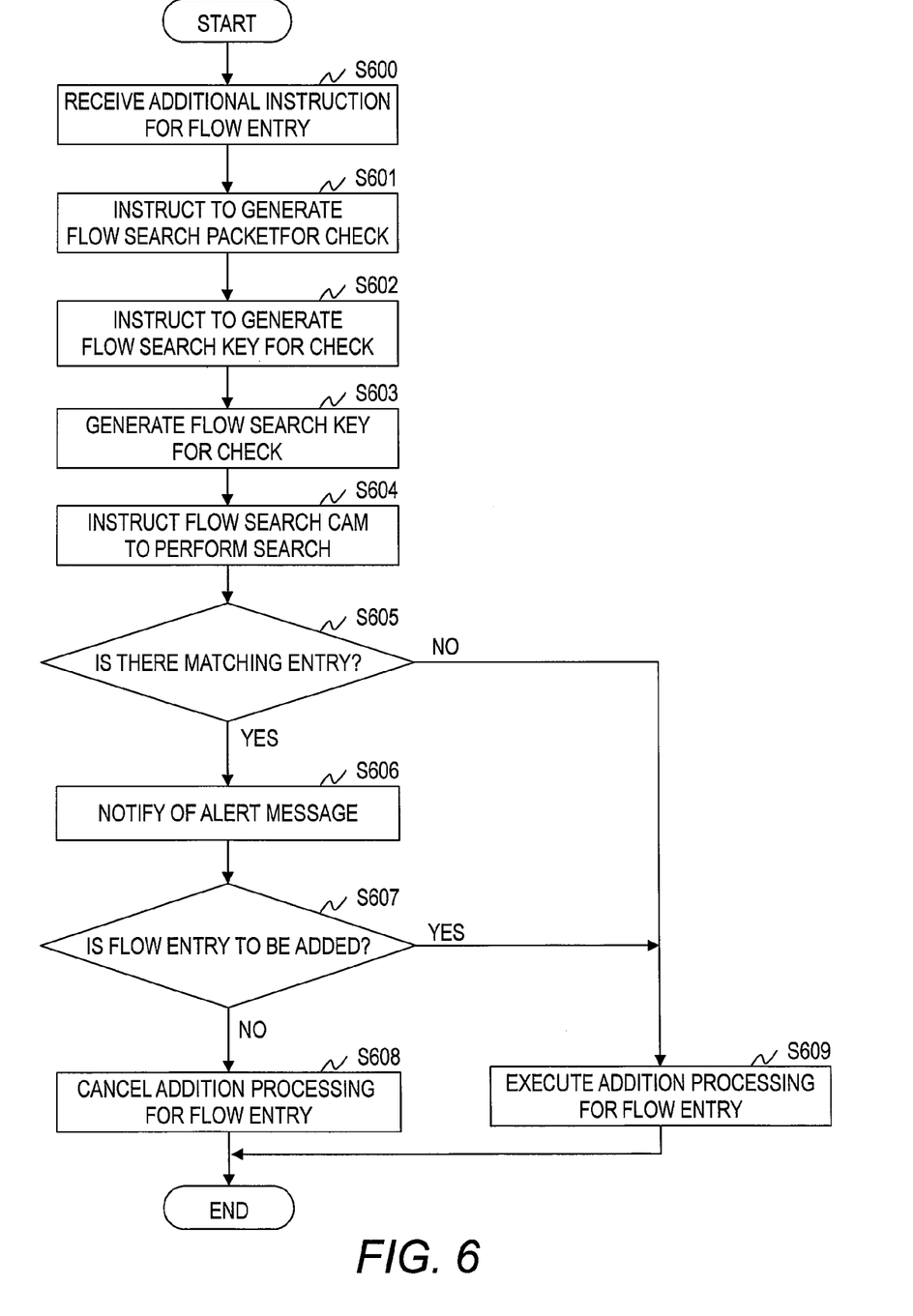
FIG. 6 is a flowchart illustrating an example of addition processing for the flow entry according to the embodiment of this invention.

FIG. 6 is a flowchart illustrating an example of addition processing for the flow entry according to the embodiment of this invention.

When receiving an additional instruction for the flow entry from the management terminal 1003 (Step S600), the packet transfer apparatus 1000 instructs the control processor 1200 to generate a flow search packet for check via the register 1500 (Step S601). It should be noted that the additional instruction for the flow entry includes any one of a self-origination condition indicating a condition for being applied to the own-apparatus-originated packet and a non-self-origination condition indicating a condition for excluding the own-apparatus-originated packet. Further, the additional instruction for the flow entry includes the values of the various kinds of setting information within the flow entry.

The control processor 1200 instructs the flow search key generation part 1411 to generate the flow search key for check (Step S602).

The flow search key generation part 1411 generates the flow search key for check (Step S603), and inputs a search instruction including the generated flow search key for check to the flow search CAM 1440 (Step S604). Here, the flow search key for check is generated as follows.

In the case of the piece of information in which "d.c." is set among the respective pieces of information included in the additional instruction for the flow entry, the flow search key generation part 1411 masks the bit corresponding to the piece of information. In other words, the flow search key generation part 1411 sets the piece of information within the search key as the global mask. Further, in the case of the piece of information in which "0" or "1" is set, the flow search key generation part 1411 sets the set value as the bit of the piece of information.

Subsequently, the flow search CAM 1440 searches the flow entries based on the flow search key for check to determine whether or not a matching flow entry exists (Step S605).

When the matching flow entry exists, the flow search CAM 1440 notifies the control processor 1200 of the fact via the flow search part 1410.

When it is determined that the matching flow entry exists, the control processor 1200 notifies the management terminal 1003 of an alert message (Step S606). Specifically, the control processor 1200 generates the alert message for notifying that the overlapped flow entry already exists, and transmits the generated alert message to the management terminal 1003.

After notifying of the alert message, the packet transfer apparatus 1000 waits for a response from a user who is operating the management terminal 1003.

When receiving the response to the alert message from the management terminal 1003, the packet transfer apparatus 1000 determines whether or not the flow entry is to be added to the flow search CAM 1440 (Step S607). In other words, it is determined whether or not the user has instructed to add the flow entry.

When it is determined that the flow entry is not to be added to the flow search CAM 1440, the packet transfer apparatus 1000 cancels the addition of the flow entry to the flow search CAM 1440 (Step S608), and brings the processing to an end.

When it is determined in Step S605 that the matching flow entry does not exist, or when it is determined in Step S607 that the flow entry is to be added to the flow search CAM 1440, the flow search part 1410 executes the addition processing for the flow entry to the flow search CAM 1440 in accordance with the additional instruction for the flow entry (Step S609), and brings the processing to an end. It should be noted that known processing may be used as the addition processing for the flow entry, and hence a detailed description thereof is omitted.

It should be noted that the RAM entry corresponding to the added flow entry may be added to the flow search RAM 1450.

Figure 7:
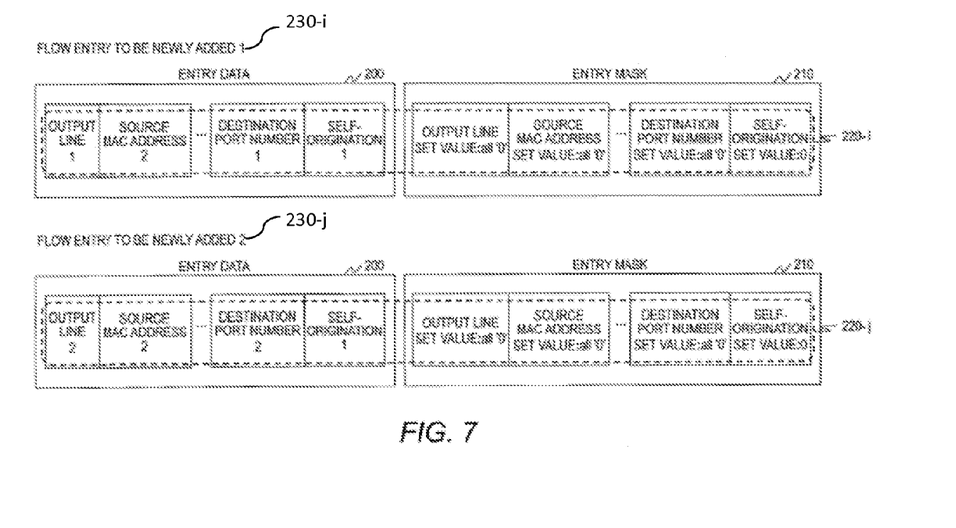
FIG. 7 is an explanatory diagram illustrating an example of a flow entry to be newly added according to the embodiment of this invention.

FIG. 7 is an explanatory diagram illustrating an example of a flow entry to be newly added according to the embodiment of this invention.

When receiving the additional instruction for a to-be-newly-added flow entry 1 (230-*i*), the flow search key generation part 1411 generates the flow search key for check by using all the values within the to-be-newly-added flow entry 1 (230-*i*) as the values of the search key.

In this case, the to-be-newly-added flow entry 1 (230-*i*) matches the values of the pieces of information other than the source MAC address and the self-origination flag for which "d.c." is set within the flow entry 220-1 illustrated in FIG. 2, and hence the alert message is notified of.

When receiving the additional instruction for a to-be-newly-added flow entry 2 (230-*j*), the flow search key generation part 1411 generates the flow search key for check by using all the values within the to-be-newly-added flow entry 2 (230-*j*) as the values of the search key.

In this case, the value of the output line within the to-be-newly-added flow entry 2 (230-*j*) is different from the value of the output line within the flow entry 220-1. Further, the value of the source MAC address within the to-be-newly-added flow entry 2 (230-*j*) is different from the value of the source MAC address within the flow entry 220-1. Therefore, the to-be-newly-added flow entry 2 (230-*j*) is not notified of the alert message.

Figure 8:
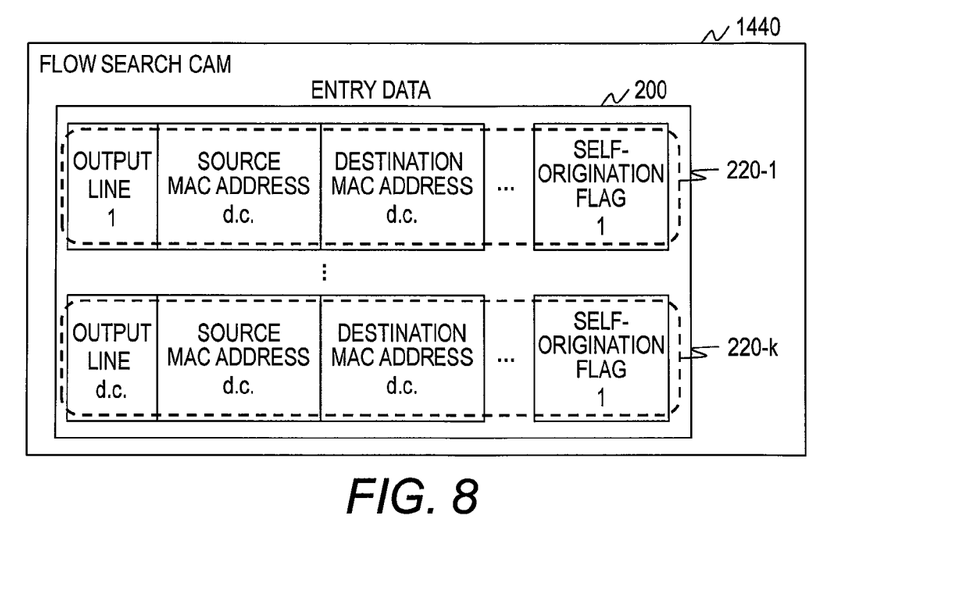
FIG. 8 is an explanatory diagram illustrating an example of adding the entry to the flow search CAM according to the embodiment of this invention.
Figure 9:
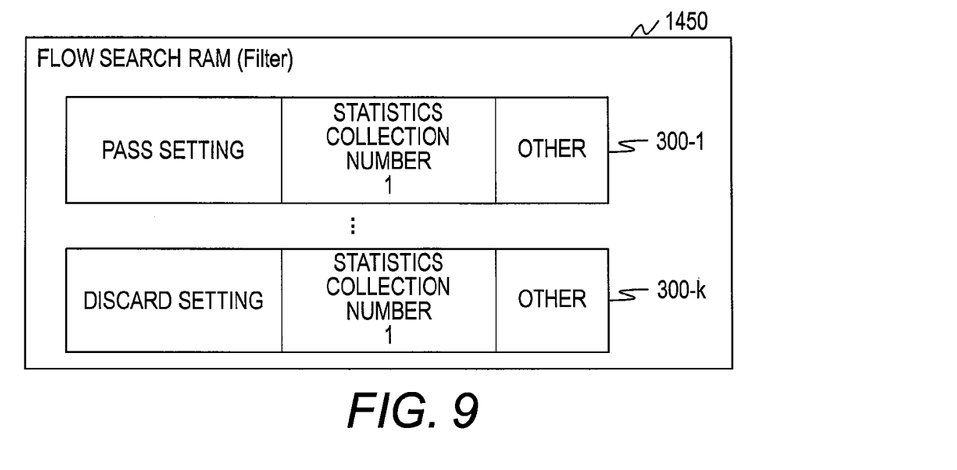
FIG. 9 is an explanatory diagram illustrating an example of adding the entry to the flow search RAM according to the embodiment of this invention.

FIG. 8 is an explanatory diagram illustrating an example of adding the entry to the flow search CAM 1440 according to the embodiment of this invention. FIG. 9 is an explanatory diagram illustrating an example of adding the entry to the flow search RAM 1450 according to the embodiment of this invention.

When an administrator or the like uses a user interface provided by the management terminal 1003 to input "#list k qos mac any action priority-class 8 self", such a flow entry 220-*k* as illustrated in FIG. 8 is added to the flow search CAM 1440, and such a RAM entry 300-*k* as illustrated in FIG. 9 is added to the flow search RAM 1450.

Here, "self" is a character string indicating the application to the own-apparatus-originated packet. Therefore, the self-origination flag within the flow entry 220-*k* is set to "1". On the other hand, the character string "noself" is a character string indicating the application to the packets other than the own-apparatus-originated packet. In this case, the self-origination flag within the flow entry is set to "0".

According to this embodiment, the following effects are produced by providing the self-origination flag.

Firstly, there is an effect that the packet transfer apparatus 1000 can distinguish the own-apparatus-originated packet from the other packets based on the self-origination flag.

Hitherto, in order to distinguish the own-apparatus-originated packet from the other packets, it is necessary to add the flow entry relating to the IP address of the packet transfer apparatus 1000 to the flow search CAM 1440.

Here, a description is made of a difference between a related art and the embodiment of this invention by taking an exemplary case where the flow control for the packet other than the own-apparatus-originated packet is set by the source IP address. Hitherto, in order to realize the above-mentioned flow control, it is necessary to add at least two flow entries for excluding the IP address of the packet transfer apparatus 1000 to the flow search CAM 1440. This is because the flow entry of the flow search CAM 1440 includes the IP address.

Therefore, as the flow entry increases in number, it is necessary to add at least two RAM entries to the flow search RAM 1450 as well. This raises a problem in that memory areas become less efficient and the settings become more complicated as the number of entries increases. Further, there is a problem in that power consumption of the CAM increases due to the increase in the number of entries.

On the other hand, according to the embodiment of this invention, it suffices that only the flow entry whose self-origination flag is "0" is added. Therefore, it is possible to suppress the increase in the number of entries and to resolve the complication of the settings. Further, by suppressing the increase in the number of entries, it is possible to reduce the power consumption of the CAM. In addition, the settings based on the IP address or the like are not necessary, and hence it is possible to reuse the same settings even when the IP address of the packet transfer apparatus 1000 is changed.

Further, to set the flow control for the own-apparatus-originated packet, it suffices to add the flow entry whose self-origination flag is "1".

Secondly, the packet transfer apparatus 1000 can identify a spoofed packet. Hitherto, the packet transfer apparatus 1000 can discriminate the spoofed packet by unicast reverse path forwarding (uRPF). However, when the spoofed packet is not discarded even by uRPF, the packet transfer apparatus 1000 according to this embodiment can identify and discard the spoofed packet based on the self-origination flag. This is because the value of the self-origination flag is set to "1" in the case of the own-apparatus-originated packet and the value of the self-origination flag is set to "0" in the case of the other packets.

Thirdly, the self-origination flag is masked when a new flow entry is added, and it is examined whether or not there is a flow entry having the overlapped values of the other pieces of information, to thereby be able to notify the user of an overlap, an error, and the like of the flow entry. In this embodiment, the values of the IP address and the like can be set to "d.c." by use of the self-origination flag, and hence an overlapped entry or an erroneous entry is highly likely to be added. Accordingly, such processing as illustrated in FIG. 6 is executed when a new flow entry is added, to thereby be able to suppress the addition of a wasteful flow entry or an erroneous flow entry.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A packet transfer apparatus to be coupled to at least one input line and at least one output line to receive a packet and transfer the packet to another apparatus,
    the packet transfer apparatus comprising:
    a packet reception part for receiving the packet;
    a packet transmission part for transmitting the packet from the at least one output line;
    a packet generation part for generating an own-apparatus-originated packet serving as a packet for instructing a predetermined operation and outputting the own-apparatus-originated packet to the packet reception part;
    a packet search part for determining a content of flow control for the received packet and searching for an output circuit through which the received packet is to be output;
    a search memory for storing the content of the flow control and information for identifying the output circuit through which the packet is to be output; and
    a packet transfer processing part for executing switching processing for the received packet, wherein:
    the packet reception part is configured to:
    determine whether the received packet is the own-apparatus-originated packet; and
    output a self-origination flag indicating a result of the determining and header information of the received packet to the packet search part; and
    the packet search part determines the content of the flow control for the received packet by referring to the search memory based on the self-origination flag and the header information.

2. The packet transfer apparatus according to claim 1, wherein:
    the packet search part includes:
        a flow search part for determining the content of the flow control for the packet; and
        a path search part for searching the at least one output line for the output line through which the packet is to be output;
    the search memory includes a first flow search memory for identifying a flow corresponding to the packet and outputting an address relating to the flow, a second flow search memory for storing the content of the flow control, and a path search memory for storing information for identifying the output line through which the packet is to be output;
    the first flow search memory stores at least one entry including information composed of at least one bit for identifying the flow corresponding to the packet;
    the at least one entry includes a bit relating to the self-origination flag;

the flow search part is configured to:
    generate a first search key based on the self-origination flag and the header information;
    search the first flow search memory for an entry that matches the first search key, to thereby identify the flow corresponding to the received packet;
    acquire an address for identifying the content of the flow control for the packet from the retrieved entry; and
    acquire information indicating the content of the flow control for the packet from the second flow search memory based on the acquired address; and
    the path search part identifies the output line through which the packet is to be output by referring to the path search memory based on the header information.

3. The packet transfer apparatus according to claim 2, wherein the packet search part is configured to:
    generate a second search key for searching the first flow search memory based on an additional instruction for the new flow control in case of receiving the additional instruction for a new flow control;
    determine whether an overlapped entry is set in the first flow search memory based on the generated second search key;
    generate an alert message for notifying that the overlapped entry is set in the first flow search memory in case where it is determined that the overlapped entry is set in the first flow search memory; and
    output the generated alert message.

4. The packet transfer apparatus according to claim 3, wherein:
    the additional instruction for the flow control includes values of a plurality of pieces of setting information for identifying the flow corresponding to the packet; and
    the packet search part is configured to:
    set the numerical value set in one of the plurality of pieces of setting information in case where the one of the plurality of pieces of setting information has an arbitrary numerical value; and
    generate the second search key by masking the value of one of the plurality of pieces of setting information in case where one of the plurality of pieces of setting information has a value indicating that the one of the plurality of pieces of setting information is not to be referred to.

5. The packet transfer apparatus according to claim 2, wherein, when receiving an additional instruction for the content of the flow control for a packet other than the own-apparatus-originated packet, the flow search part adds an entry within which information indicating the packet other than the own-apparatus-originated packet is set in the self-origination flag, to the first flow search memory.

6. The packet transfer apparatus according to claim 2, wherein the content of the flow control for the packet includes at least any one of filter processing for performing one of addition and discard of a packet satisfying a predetermined condition and QoS processing for maintaining communication quality.

7. A packet transfer method for a packet transfer apparatus to be coupled to at least one input line and at least one output line to receive a packet and transfer the packet to another apparatus,
    the packet transfer apparatus including a packet reception part, a packet generation part for generating an own-apparatus-originated packet, a packet search part for determining a content of flow control for the packet and searching the at least one output line for an output circuit through which the packet is to be output, and a search memory, the packet transfer method including:
a first step of determining, by the packet reception part, whether the received packet is the own-apparatus-originated packet;
a second step of outputting, by the packet reception part, a self-origination flag indicating a result of the determining and header information of the received packet to the packet search part; and
a third step of determining, by the packet search part, the content of the flow control for the received packet by referring to the search memory based on the self-origination flag and the header information.

8. The packet transfer method according to claim 7, wherein:
the packet search part includes a flow search part and a path search part;
the search memory includes a flow search memory and a path search memory;
the flow search memory stores at least one entry including information composed of at least one bit for identifying a flow corresponding to the packet;
the at least one entry includes a bit relating to the self-origination flag;
the second step includes step of generating, by the flow search part, a first search key based on the self-origination flag and the header information;
the third step includes steps of searching, by the flow search part, the flow search memory for an entry that matches the first search key, to thereby identify the flow corresponding to the received packet, acquiring, by the flow search part, an address for identifying the content of the flow control for the packet from the retrieved entry, and acquiring, by the flow search part, information indicating the content of the flow control for the packet from the flow search memory based on the acquired address; and
the packet transfer method further includes step of identifying, by the path search part, the output line through which the packet is to be output by referring to the path search memory based on the header information.

9. The packet transfer method according to claim 8, further comprising:
generating, by the packet search part, a second search key for searching the flow search memory based on an additional instruction for the new flow control in case of receiving the additional instruction for a new flow control;
determining, by the packet search part whether an overlapped entry is set in the flow search memory based on the generated second search key;
generating, by the packet search part, an alert message for notifying that the overlapped entry is set in the flow search memory in case where it is determined that the overlapped entry is set in the flow search memory; and
outputting, by the packet search part, the generated alert message.

10. The packet transfer method according to claim 8, further comprising adding, by the flow search part, when receiving an additional instruction for the content of the flow control for a packet other than the own-apparatus-originated packet, an entry within which information indicating the packet other than the own-apparatus-originated packet is set in the self-origination flag, to the flow search memory.

* * * * *